July 14, 1931.                W. J. GEIB                1,814,912
VEHICLE TOWING DEVICE
Filed July 30, 1929
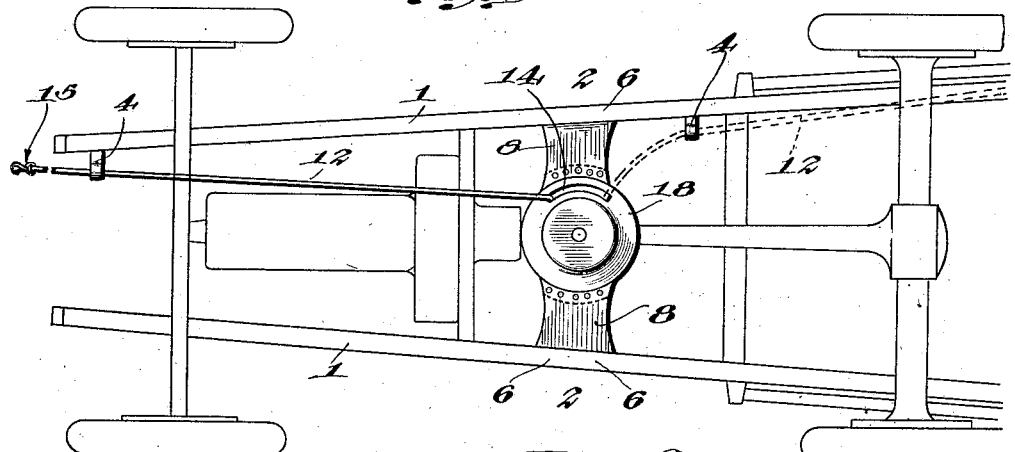
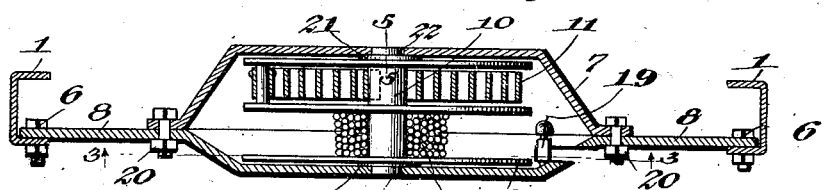
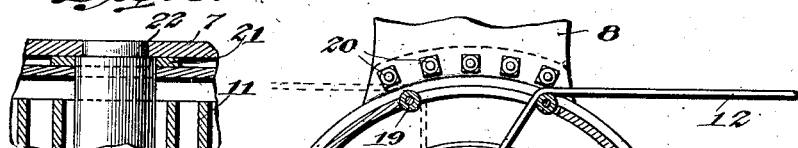
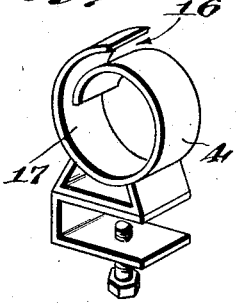
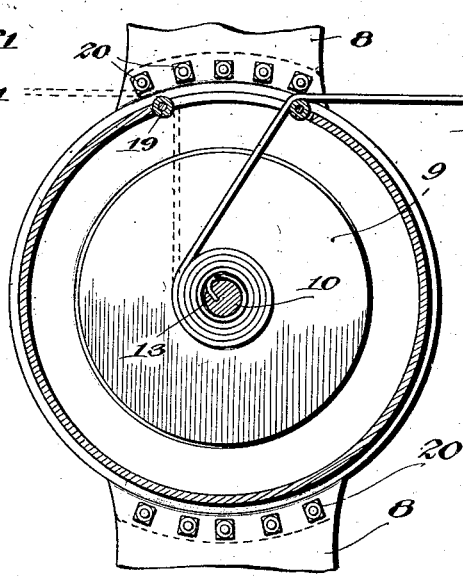
WITNESS
INVENTOR
W. J. Geib,
BY
ATTORNEY Patented July 14, 1931

1,814,912

UNITED STATES PATENT OFFICE

WARREN J. GEIB, OF MADISON, WISCONSIN

VEHICLE TOWING DEVICE

Application filed July 30, 1929. Serial No. 382,198.

My invention relates to improvements in vehicle towing devices, and it consists in the combinations, constructions and arrangements herein described and claimed.

Generally, my invention consists of an improved recoiling towline, which has several advantages not shown in the prior art.

One of the objects of my invention is to provide a recoiling towing device which may be easily attached to the frame of an automobile, tractor or other vehicle.

Another object is the placing of my device in such manner that it will not ordinarily be in view to the casual observer, and its use will not therefore detract from the beauty of the vehicle, where, in the case of automobiles, such beauty is to be desired.

A further object is the provision of a device of greater utility, in that in my invention, the same towline may be used both for towing and for being towed.

A further object is to provide a device of this kind which will be of greater convenience than any heretofore invented, but not at a sacrifice of simplicity of construction.

Other objects and advantages will appear in the following specification, and the novel features of the invention will be particularly pointed out in the appended claim.

My invention is illustrated in the accompanying drawings, forming part of this application, in which Figure 1 is a bottom view, showing my device attached to the frame of an automobile, Figure 2 is a cross sectional view taken on line 2—2 of Figure 1, Figure 3 is a horizontal sectional view taken on line 3—3 of Figure 2, Figure 4 is a perspective view of one of the spiral guides, hereinafter described, Figure 5 is a sectional view through line 5—5 of Figure 2.

Referring to the drawings, I have shown therein my device mounted at or near the center of an automobile frame 1, as at 18. A metal casing 7 is provided with laterally extending arms 8, which are rigidly attached to the frame 1 by suitable means, as by bolts 6. The lower portion of the casing 7 may be integral with the arms 8, as shown in Figure 2, the upper portion being fastened thereto by bolts 20.

Within the casing 7, I have shown a partitioned reel 9, which has an axle 10 mounted within said casing in the manner shown in Figure 5. The axle 10 is mounted within suitable openings 22 in the casing 7, and the reel is spaced from the casing 7 by spacers or washers 21. The reel is adapted to accommodate a recoil spring 11 in its upper portion and a cable 12 in its lower portion.

This cable 12 is preferably made of woven steel, but may be of any strong flexible material. One end of said cable is securely fastened to the axle 10, as shown at 13, while the other end passes through a slot 14, which is located in the lower portion of the casing 7, over rollers 19 mounted at each end of the slot 14, thence through spiral guides 4. The cable has at its extremity a snap hook 15 for attaching to the vehicle towing or being towed as the case may be.

The guides 4 are spiral in form so that the cable 12 may be quickly inserted through the aperture 16, and quickly removed by exerting a slight pressure at 17 with the cable during the act of removal.

In using my device it is merely necessary to grasp the snap hook 15 and pull it against the action of the spring 11, passing the cable 12 through the apertures 16 of the guides 4 as the cable is unwound, and then attach the snap hook 15 to the vehicle which is to be towed or which will do the towing, as the case may be. When no longer needed it is only necessary to unfasten the snap hook 15 and release the cable from the guides 4, the spring 11 automatically causing the cable 12 to be rewound upon the reel 9.

I claim as new and desire to secure by Letters Patent:

In a device of the character described, a reel comprising a casing formed of two sections, one section having oppositely projecting attaching arms and a curved slot concentric to the axis of the section and having a roller at each end, the other section having flanges opposite the said arms and secured thereto, a shaft mounted in the casing, members on the shaft and forming therewith two drums, a coiled spring in one drum, and a cable wound on the shaft in the other drum and passed through the said slot and having a hook at its end, said cable being adapted to be passed over either roller of the slot so as to extend either in a forwardly or rearwardly direction.

WARREN J. GEIB.